(12) United States Patent
Martin

(10) Patent No.: US 7,794,607 B2
(45) Date of Patent: Sep. 14, 2010

(54) COMPOSITION AND METHOD FOR ENHANCED SANITATION AND OXIDATION OF AQUEOUS SYSTEMS

(75) Inventor: Roy W. Martin, Downers Grove, IL (US)

(73) Assignee: Truox, Inc., McClellan, CA (US)

( * ) Notice: Subject to any disclaimer, the term of this patent is extended or adjusted under 35 U.S.C. 154(b) by 590 days.

(21) Appl. No.: 11/598,384

(22) Filed: Nov. 13, 2006

(65) Prior Publication Data

US 2007/0193958 A1  Aug. 23, 2007

Related U.S. Application Data

(63) Continuation-in-part of application No. 11/494,228, filed on Jul. 27, 2006, which is a continuation-in-part of application No. 11/226,100, filed on Sep. 14, 2005, now Pat. No. 7,572,390, which is a continuation-in-part of application No. 11/158,676, filed on Jun. 22, 2005, now Pat. No. 7,476,333.

(51) Int. Cl.
  *C02F 1/72* (2006.01)
  *C02F 1/68* (2006.01)
  *C02F 1/76* (2006.01)
  *C01B 15/08* (2006.01)
  *C01B 11/00* (2006.01)

(52) U.S. Cl. .............. 210/759; 210/763; 252/186.21; 252/186.32; 252/186.27; 252/186.34; 252/186.35; 252/186.36; 252/187.1; 252/187.23; 252/187.24; 252/187.27; 252/187.28; 252/186.33

(58) Field of Classification Search ............. 502/100; 210/749, 753, 96.1, 759, 763; 510/311, 372; 504/127, 150; 8/111; 252/186.28, 186.21, 252/186.32, 186.27
See application file for complete search history.

(56) References Cited

U.S. PATENT DOCUMENTS

| | | | | |
|---|---|---|---|---|
| 3,532,634 A * | 10/1970 | Woods | ........................... | 8/111 |
| 3,577,490 A * | 5/1971 | Welsh et al. | ................. | 264/120 |
| 4,492,618 A * | 1/1985 | Eder | ........................... | 205/701 |
| 4,555,457 A * | 11/1985 | Dhanji | ........................ | 429/199 |
| 4,804,491 A * | 2/1989 | Choy et al. | .................. | 510/372 |
| 5,114,611 A * | 5/1992 | Van Kralingen et al. | ...................... | 252/186.33 |
| 5,126,057 A * | 6/1992 | Worley et al. | ................ | 504/156 |
| 5,514,287 A * | 5/1996 | Jones et al. | .................. | 210/753 |
| 5,599,781 A * | 2/1997 | Haeggberg et al. | ........... | 510/220 |
| 6,004,510 A * | 12/1999 | Gilbert et al. | .................. | 422/29 |
| 6,139,769 A * | 10/2000 | Nestler | .................... | 252/186.39 |
| 6,221,826 B1 * | 4/2001 | Surutzidis et al. | ............ | 510/349 |

(Continued)

OTHER PUBLICATIONS

SDA Science, "Antimicrobial" {http://www.sdascience.org/index.php?option=com_content&task=view&id=91&ITemid=124} paragraph bridging pp. 1-2.*

(Continued)

*Primary Examiner*—Joseph D Anthony

(57) ABSTRACT

Compositions and methods for their use are presented that substantially increase the rate of inactivation of microbiological organisms, especially those resistant to inactivation from free halogen based sanitizers, and oxidation of oxidation resistant organic based compounds in aqueous solution. Aquatic facilities susceptible to accumulation of organic N-chloramines, cyanuric acid and other oxidation resistant compounds, as well as oxidation resistant parasitic organisms such as cryptosporidium and Giardia, obtain dramatic improvements in the rate of oxidation and subsequent inactivation of these undesirable contaminants.

3 Claims, 5 Drawing Sheets

U.S. PATENT DOCUMENTS

| | | | | |
|---|---|---|---|---|
| 6,409,926 | B1* | 6/2002 | Martin | 210/709 |
| 6,455,751 | B1* | 9/2002 | Hoffman et al. | 588/320 |
| 6,566,318 | B2* | 5/2003 | Perkins et al. | 510/310 |
| 6,569,353 | B1* | 5/2003 | Giletto et al. | 252/186.28 |
| 6,863,830 | B1* | 3/2005 | Purdy et al. | 210/756 |
| 7,090,820 | B2* | 8/2006 | Martin | 423/513 |
| 7,204,931 | B2* | 4/2007 | Martin et al. | 210/755 |
| 7,255,797 | B2* | 8/2007 | Martin | 210/754 |
| 7,390,418 | B2* | 6/2008 | Martin et al. | 210/758 |
| 7,465,410 | B2* | 12/2008 | Martin et al. | 252/186.25 |
| 7,476,333 | B2* | 1/2009 | Martin | 252/186.33 |
| 7,514,019 | B2* | 4/2009 | Martin | 252/187.23 |
| 7,572,384 | B2* | 8/2009 | Martin | 210/759 |
| 7,572,390 | B2* | 8/2009 | Martin | 252/186.33 |
| 2002/0128165 | A1* | 9/2002 | Baker et al. | 510/309 |
| 2002/0152036 | A1* | 10/2002 | Martin | 702/22 |
| 2003/0104942 | A1* | 6/2003 | Breau | 504/150 |
| 2004/0149634 | A1* | 8/2004 | Hughes | 210/96.1 |
| 2005/0167635 | A1* | 8/2005 | Martin et al. | 252/186.1 |
| 2006/0078584 | A1* | 4/2006 | Lightcap et al. | 424/405 |
| 2006/0205626 | A1* | 9/2006 | Gant et al. | 510/367 |
| 2006/0293177 | A1* | 12/2006 | Martin | 502/321 |
| 2006/0293178 | A1* | 12/2006 | Martin | 502/321 |
| 2006/0293179 | A1* | 12/2006 | Martin | 502/321 |
| 2007/0193958 | A1* | 8/2007 | Martin | 210/749 |
| 2009/0304810 | A1* | 12/2009 | Martin | 424/613 |

OTHER PUBLICATIONS

EPA FIFRA Documents {http://www.epa.gov/pesticides/regulating/index.htm#eval}.*

Aluminum Hydroxide JTBaker MSDS {http://www.jtbaker.com/msds/englishhtml/a2796.htm} synonyms / Product Identification section.*

Potassium monopersulfate PUBCHEM {http://pubchem.ncbi.nlm.nih.gov/summary/summary.cgi?cid=160937}.*

Potassium Persulfate Wikipedia {http://en.wikipedia.org/wiki/Potassium_persulfate}.*

Potassium peroxymonosulfate {http://en.wikipedia.org/wiki/Potassium_peroxymonosulfate}.*

MSDSGuardexSuper1997 {http://www.docstoc.com/docs/5271704/Page-of-MATERIAL-SAFETY-DATA-SHEETMSDS-Guardex-Super}.*

Pool Source Catalog 2004 p. 101 http://www.gpspool.com/customer/geposp/customerpages/catalog_updates/2004/Pool/2004PoolSourcerCat_44-142_Breaker-Chemicals.pdf}.*

* cited by examiner

COMPOSITION AND METHOD FOR ENHANCED SANITATION AND OXIDATION OF AQUEOUS SYSTEMS

CROSS-REFERENCE TO RELATED APPLICATIONS

This application is a continuation-in-part of application Ser. No. 11/494,228 filed Jul. 27, 2006 pending, which is a continuation-in-part of application Ser. No. 11/226,100 filed Sep. 14, 2005 now U.S. Pat. No. 7,572,390, which is a continuation-in-part of application Ser. No. 11/158,676 filed Jun. 22, 2005 now U.S. Pat. No. 7,476,333. The priority applications are expressly incorporated by reference herein in their entirety.

BACKGROUND OF THE INVENTION

1. Field of Invention

This invention relates to compositions for enhanced sanitation and oxidation of aqueous solutions, such as aquatic facilities, and methods for their use.

2. Background of the Technology

Aquatic facilities such as swimming pools, spas and fountains have become increasingly popular in private homes, hotels, fitness centers, and resorts. To ensure that the aquatic facilities can be enjoyed safely, the water must be treated to reduce or eliminate chemical oxygen demands (COD) and/or total organic carbon (TOC), and various pathogens such as bacteria, viruses, parasitic organisms and algae. When the COD and/or TOC increases in the water, the oxidation reduction potential of the water decreases and oxidizers are added to maintain a healthy level of oxidation reduction potential. A common oxidizer that is used in aquatic facilities is chlorine or bromine. However, when chlorine or bromine is present in the water above a certain level in the presence of COD and/or TOC, trihalomethanes (THM) and chloramines form in the water undesirably.

Common ingredients for treating water systems include various persulfate salts and persulfate donors such as potassium monopersulfate (PMPS), which is typically available in the form of a triple salt, $(KHSO_5)x.(KHSO_4)y.(K_2SO_4)z$ (herein referred to as "PMPS triple salt"). However, PMPS typically contains persulfate salts, such as potassium persulfate ($K_2S_2O_8$) as a by-product, are difficult to use because such persulfate salts can cause severe irritation to aquatic facility users (e.g., swimmers, bathers), in particular at concentrations above about 2 ppm. The strong oxidation potential of PMPS triple salt makes it effective for decreasing the concentration of COD. Typically, these chemicals are applied to the aquatic facility through a "shock treatment" whereby the facility is evacuated and the product is broadcast across the water surface. The facility users may not be allowed to come in contact with the treated water for a period of time after the treatment due to concerns for irritation. Typically facility users may not be allowed to come in contact with the treated water for about 15-30 minutes until the chemical has dissipated.

PMPS usually contains potassium persulfate ($K_2S_2O_8$) as a result of being prepared using oleum. Persulfates such as $K_2S_2O_8$ have a long half-life in aquatic facilities and are undesirable due to their irritant nature. As a result of the concerns for irritation resulting from accumulation of persulfate, PMPS can only be used in aquatic facilities in limited amounts, which typically do not exceed two pounds per 10,000 gallons of water per week.

While PMPS maintains the water quality in aquatic facilities reasonably well, it is not convenient to use because of the need to evacuate the facility during use and the fact that it can only be used in limited doses regardless of how heavily the facility is used. Furthermore, compounds found in aquatic and aqueous solutions may be resistant to oxidation by free halogen donors, such as chlorine and bromine, as well as commonly used oxidizers such as potassium monopersulfate, and alkali metal persulfates.

For example, when natural waters and wastewater are chlorinated, there is a residual oxidant formed, which remains stable at the breakpoint and in the presence of hypochlorite beyond the breakpoint. This residual oxidant responds to conventional methods of analysis in the same way monochloramine does. It can be shown that some organic amino nitrogen compounds form very stable organic N-chloramines that, unlike inorganic chloramines, do not decompose in the presence of excess hypochlorite". (Drinking Water Criteria Document For Chloramines, Health and Ecological Criteria Division, Office of Science and Technology, Office of Water. Environmental Protection Agency, 1994).

To further illustrate, cyanuric acid, commonly used to stabilize chlorine donors such as trichloroisocyanuric acid, and dichloroisocyanuric acid can be placed in contact with hundreds of parts per million (PPM) of free chlorine as well as potassium monopersulfate, with no measurable affect on its concentration in water. Furthermore, the presence of transition metals such as copper or silver commonly used as an algae control agent, and applied in a concentration acceptable for use an algae control agent (typically between 0.2-0.5 ppm) with excess free halogen and potassium monopersulfate has no significant affect on the concentration of the oxidation resistant organic compounds like cyanuric acid.

Furthermore, with the accumulation of organic contaminants in the aqueous solution, the Oxidation Reduction Potential (ORP) is reduced unless the concentration of free halogen donor increases. When the concentration of free chlorine rises, the potential for formation of volatile trihalomethanes and chloramines increases (FIGS. 2 and 3). With a reduction in ORP, the rate of inactivation of microbiological organisms is reduced, and the potential for transfer of the organisms through the water from mammal to mammal increases. With application of the compositions and methods of the disclosed invention, the organic contaminants are rapidly oxidized, thereby allowing the ORP to be sustained or even increased with the same concentration of free halogen in the aqueous solution. Increases in ORP are correlated with an increased rate of inactivation of microbiological organisms.

Further still, many microbiological organisms such as parasitic organisms exemplified by cryptosporidium are very resistant to inactivation by free halogen donors due to the oxidation resistant compound (phospholipids and proteins) making up the environmentally protective membranes, in this case the outer oocyst. Inactivation or destruction of algae blooms requires high levels of free halogen with extended contact time due to the protective cellulose membrane of the algae.

While various oxidizer systems have been developed and explored for destruction of TOC, i.e., organics in ground water etc, there is a need for compositions and methods for applying such compositions to increase the rate of inactivation of microbiological organisms, in particular, oxidation resistant organisms such as parasitic organisms including cryptosporidium. There is also a need for compositions and methods for applying such compositions to increase the rate of inactivation of oxidation of oxidation resistant compounds in aqueous solution, more specifically aquatic facilities and drinking water.

Furthermore, there is a need for compositions and methods that are effective to facilitate quick recovery of an aquatic facility contaminated by oxidation resistant compounds as well as from the release of microbiological organisms derived from bodily discharge (i.e. fecal release, vomit, blood etc.), in particular those that exhibit resistance to inactivation from traditional free halogen donors and standard oxidizers such as potassium monopersulfate and persulfates. Further still, there exist a need for compositions and methods of applying said compositions to increase the rate of inactivation and oxidation in aqueous systems contaminated with organic compounds.

The present invention addresses these needs by providing compositions and methods for increasing the rate of inactivation of microbiological organisms and oxidation of oxidation resistant compounds in an aquatic facility, as detailed herein below.

SUMMARY OF THE INVENTION

The invention is based on the discovery that certain transition metal catalysts can be employed in multi-oxidizer based compositions and their respective solutions to selectively decompose undesirable oxidants into desirable free radicals while leaving the desired oxidants substantially unaltered, resulting in enhanced sanitizing and oxidizing efficiency of the resulting solution.

Further still, it has been discovered that certain catalysts can be employed in such multiple oxidizer compositions to dramatically increase the rate of decomposition of oxidation resistant organic contaminants, and enhance the rate of inactivation of a wide range of microbiological organisms, including parasitic organisms that are resistant to traditional sanitizer treatments.

The invention provides compositions and methods for increasing the rate of inactivation of microbiological organisms and oxidation of oxidation resistant compounds in an aqueous system, comprising: a monopersulfate donor, a transition metal catalyst comprising cobalt, and whereby the addition of the composition increases the rate of inactivation of said microbiological organisms and oxidation of oxidation resistant compounds, wherein the aqueous system may be pretreated with a free halogen donor.

Exemplary free halogen donors include dichloroisocyanuric acid, calcium hypochlorite, lithium hypochlorite, dihalodimethylhydantoin and trichloroisocyanuric acid.

In one embodiment of the invention, the composition has a weight ratio of monopersulfate to transition metal catalyst comprising cobalt measured as elemental cobalt that ranges from 50:1 to 50000:1.

The persulfate donor may be an alkali metal salt of monopersulfate, such as potassium monopersulfate or sodium monopersulfate or it may be ammonium persulfate, potassium persulfate or sodium persulfate.

A peroxymonosulfate donor may comprise Caro's acid, be an ammonium based monopersulfate or an alkali metal salt of monopersulfate.

In another embodiment, the composition has a weight ratio of monopersulfate to transition metal catalyst comprising cobalt measured as elemental cobalt ranges from 50:1 to 50000:1 and a weight ratio of persulfate donor to transition metal catalyst measured as elemental metal that ranges from 2:1 to 600:1.

In yet another embodiment; the composition has a weight ratio of free halogen donor to persulfate donor which ranges from between 99:1 to 0.01:1.

Exemplary transition metal catalysts include: copper; iron; silver; manganese; cobalt; nickel; vanadium; cerium and ruthenium.

A composition of the invention may be used to form sulfate free radicals from $S_2O_8^=$, where upon contact with water, the composition produces a solution rich in free halogen donor and sulfate free radicals, while the aqueous system remains substantially free of $S_2O_8^=$.

In another embodiment, the invention provides composition that allow a persulfate donor to be applied to an aqueous solution to produce a solution containing sulfate free radicals, while the aqueous solution treated with the persulfate remains substantially free of persulfate.

The microbiological organisms may be parasitic organisms, such as Cryptosporidium or Giardia; bacteria; viruses or algae.

A composition of the invention may comprise one or more of: a coagulant; a ligand bearing complexing agent that stabilizes the cobalt monopersulfate solution; an optional chlorite donor; an optional barrier film; or an additional transition metal catalyst, wherein the additional transition metal catalyst comprises at least one of copper, silver, iron, manganese, cerium, ruthenium, vanadium and nickel.

An optional barrier film for use in practicing the invention may segregates at least the halogen and persulfate donor of the composition and may consist of at least magnesium carbonate.

A coagulating agent for use in practicing the invention may be aluminum sulfate, a metal alkali salt of aluminate, or aluminum trihydrate.

In some embodiments a composition for use in the compositions and methods of the invention is a free flowing powder, wherein the composition is applied by broadcasting across the surface of the pool or by decanting into a desired location of the aquatic facility's circulating system.

In other embodiments, a composition of the invention is formed into a solution by contact with water, then applied to a convenient location into the aquatic facility's circulating system.

In yet other embodiments, a composition of the invention is an agglomerate, which may have any convenient geometric configuration, e.g., a tablet.

The agglomerated composition may further comprise a binding agent that reduces the rate of dissolution of the tablet and/or a pH buffering agent. A pH buffering agent may be used in the compositions and methods of the invention to generate a composition with a pH of less than 9.0.

A composition of the invention may be provided as separately packaged components.

The components of a composition of the invention may be added to the added to the aqueous system separately at the same time or at different times or may be added to the system at the same time.

The invention further provides methods for increasing the rate of inactivation of microbiological organisms in an aqueous solution treated with a Federal Insecticide, Fungicide, and Rodenticide Act (FIFRA) registered sanitizer comprising at least one of a free halogen donor and a chlorine dioxide by carrying out the steps of applying to an amount of peroxymonosulfate donor to the aqueous solution, contacting the peroxymonosulfate donor treated aqueous solution with a transition metal-catalyst comprising cobalt, and treating the aqueous solution with a sanitizer selected from at least one of a free halogen donor and chlorine dioxide to obtain a total free sanitizer concentration from about 0.2 to 10 ppm.

In some embodiments of the invention, the composition comprises a transition metal catalyst comprising cobalt maintained at a concentration of from about 1 ppb to about 2000 ppb in the aqueous solution measured as elemental cobalt and may also comprise a Federal Insecticide, Fungicide, and Rodenticide Act (FIFRA) registered sanitizer present at from about 0.2 ppm to 10 ppm in the aqueous solution.

The transition metal catalyst may be removed from the treated aqueous solution by concentrating the catalyst using a membrane and the removed catalyst may be recycled.

Various embodiments of the disclosed compositions of the invention can be applied as shock treatments to recover a contaminated aqueous system, and/or fed while the contaminants are being added to the aqueous system.

Methods of treating water in an aqueous system to enhance the rate of inactivation of oxidation resistant microbiological organisms are disclosed. The aqueous system may be an aquatic facility or potable water.

DETAILED DESCRIPTION OF THE INVENTION

Figure 1:
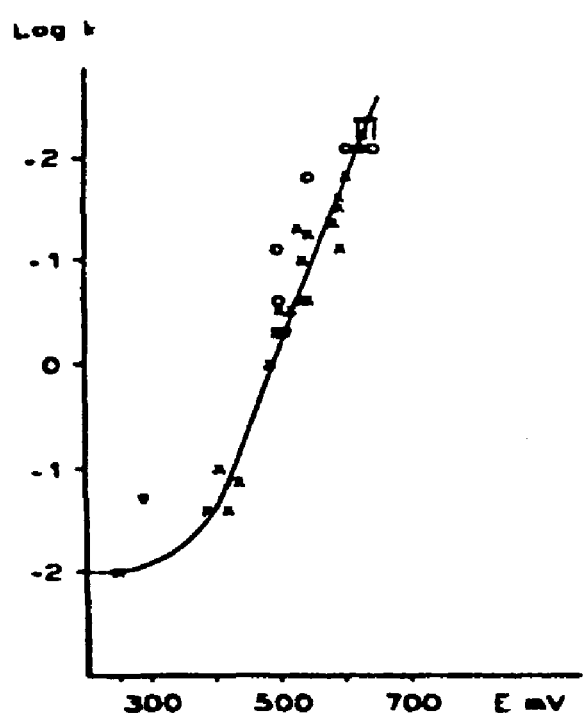
FIG. 1 is a graphic depiction of the affect of oxidation potential on Polio virus. The figure illustrates a comparison of inactivation rates using combined chlorine and free chlorine irrespective of the residual concentrations. The data illustrates that the rate of inactivation of polio virus was dependent on the Oxidation Reduction Potential (ORP) measured in millivolts (mV), and not the concentration of chlorine. (Oxidative Inactivation of Poliovirus, Virological Laboratory of the Department of Bacteriology, University of Gothenburg, and the Virological Department of the Municipal Laboratories, Gothenburg, Sweden, Ebba Lund 1963)
Figure 2:
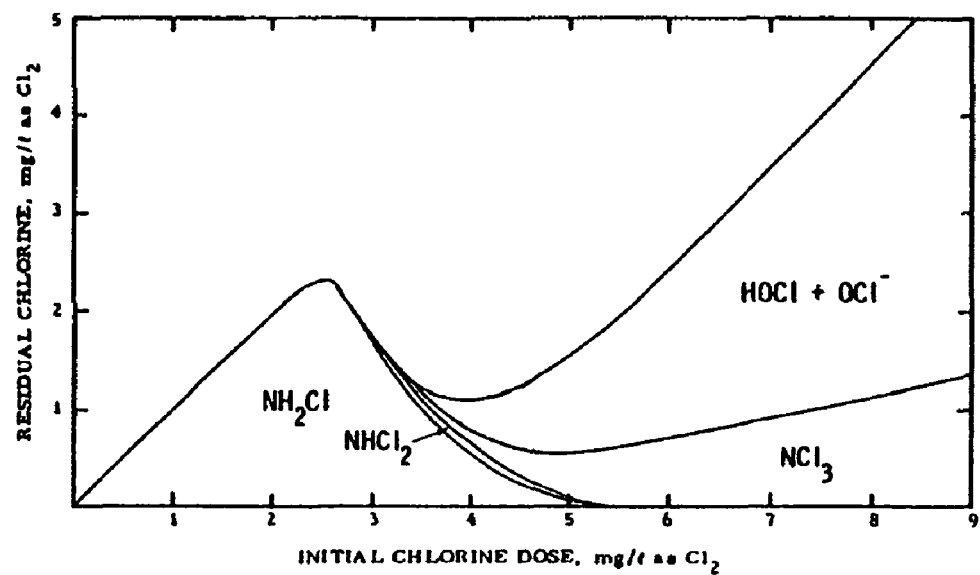
FIG. 2 is a graphic depiction of the concentration of nitrogen trichloride produced after the exposure of 0.5 ppm of nitrogen (based on ammonia); 20 minutes after an initial dose of chlorine. The graph shows that starting at 3.5 ppm of chlorine, nitrogen trichloride is produced and with increased concentrations of chlorine, a higher percentage of nitrogen trichloride is produced.
Figure 3:
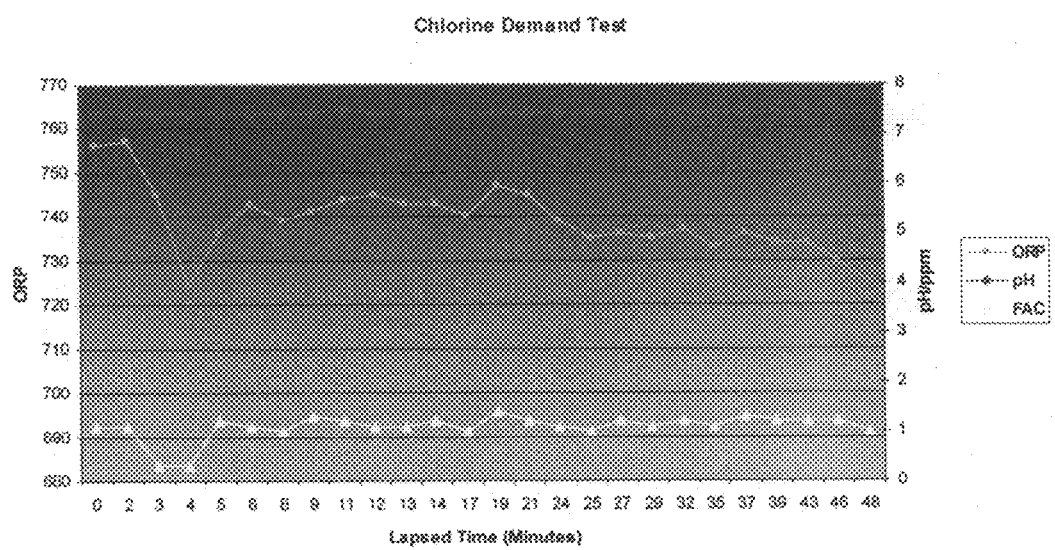
FIG. 3 is a graphic depiction of the effect of "Organic Demand" on a chlorine treated system. The graph illustrates that both free chlorine and ORP dropped after the addition of Organic Demand. While maintaining a free chlorine concentration of between 1.1-1.3 ppm, the ORP continued to decline as a result of organic byproducts produced by the reaction between chlorine and organic demand. The results show that under these conditions, chloramines and THM's increase in concentration, and the rate of inactivation of microbiological organisms is reduced resulting in reduced water quality.
Figure 4:
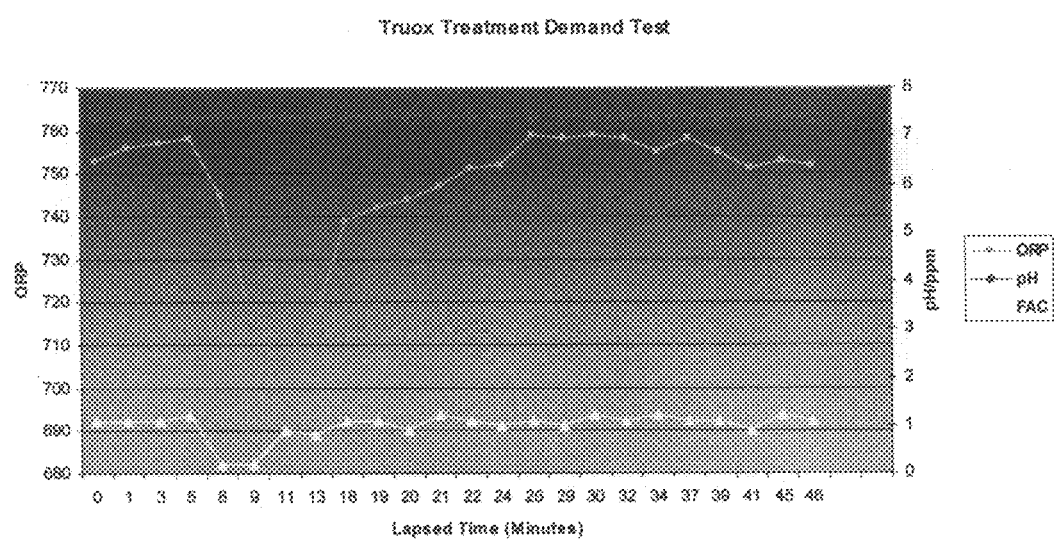
FIG. 4 is a graphic depiction of a composition of the invention on a chlorine treated system after the addition of Organic Demand. When a composition of the invention is added to the system, organic demand is rapidly oxidized and removed from the system. As shown in the figure, the free chlorine can quickly re-establish the ORP without the need for elevated free chlorine and the rate of inactivation is sustained without increased free chlorine levels. Water and air quality are sustained, and the problematic symptoms common to contaminated pools are avoided.

Various compositions and methods of the invention are described below. Although particular compositions and methods are exemplified herein, it is understood that any of a number of alternative compositions and methods are applicable and suitable for use in practicing the invention.

The practice of the present invention will employ, unless otherwise indicated, conventional techniques of water chemistry, which are known to those of skill in the art. Such techniques are explained fully in the literature.

Definitions

Unless otherwise indicated, all terms used herein have the same meaning as they would to one skilled in the art and the practice of the present invention will employ, conventional techniques of microbiology and recombinant DNA technology, which are within the knowledge of those of skill of the art.

As used herein, the terms, "comprising" or "comprises" as used with reference to a catalyst of the invention means the catalyst, regardless of its chemical composition, contains the disclosed transition metal. For example, the transition metal can be in the form of an: oxide, salt, ligand complex, alloy, or element which contains some portion of the elemental transition metal. When exposed to the aqueous solution and composition, the transition metal induces a catalytic effect as disclosed.

As used herein, the term "inactivation" is used with reference to the ability to deactivate, kill, or destroy an organism.

The term "persulfate donor" is used herein with reference to any compound or composition that includes at least 0.5 wt. % of a $S_2O_8^{2-}$-donor, such as sodium persulfate, potassium persulfate, and PMPS (potassium monopersulfate) produced from oleum. The term "persulfate donor" may be used interchangeabkly herein with the term "persulfate", in particular with reference to $S_2O_8^{2-}$.

As used herein, the term "rate of inactivation" means the time based measurement versus the level of inactivation of an organism. An increased rate of inactivation means the time required to deactivate, kill, or destroy an organism is reduced.

As used herein, the term "desired oxidants" is used with reference to free halogen donors and monopersulfate.

As used herein, the term "undesired oxidants" is used to refer to oxidants including persulfate ($S_2O_8^=$) that are prone to accumulate and induce irritation.

As used herein, the term "pH buffering agent" is used with reference to buffering agents that may be used to obtain a desired solution pH. Various phosphates, borates, carbonates are examples of pH buffers. It will be understood that any buffer used by those of skill in the art to obtaih and maintain desired solution pH may be used in the practice of the invention. For example, addition of sodium carbonate (soda ash) to a composition comprising potassium monopersulfate will result in a solution with reduced free acidity. The carbonate alkalinity consumes excess acidity resulting in an elevation in solution pH.

As used herein, the term "additional transition metal catalyst" is used with reference to a composition or solution which includes more than one catalyst in the system. This is desirable when selective catalyst are employed to provide broad effect. For example, copper ions are very effective at decomposing persulfate donors to form sulfate free radicals, but have little effect on monopersulfate. Alternatively, cobalt is very effective at decomposing monopersulfate to form sulfate free radicals but has very limited effect at normal pool water pH 7.2-7.6 at decomposing persulfate. By combining at least two catalysts in the system, broad spectrum decomposition occurs thereby enhancing the conversion of persulfate free radical precursors to sulfate free radicals.

As used herein, the term "barrier film" is used with reference to an additive used to segregate at least two components of a composition that maybe considered incompatible. Such incompatibility may be due to sensitivity to opposing pH, moisture, and/or reactivity. The type of barrier film, if at all required, is selected based on the nature of the components in the composition and their respective detriment to the composition, i.e. stability, reactivity, Department of Transportation (DOT) regulations, impact of composition performance and the like). Ideally barrier films not only substantially reduce the detrimental effects, but can also enhance the processing, handling, packaging requirements, DOT classification, storage, as well as performance of the composition in a given application. One example includes adding aluminum trihydrate to calcium hypochlorite containing compositions to reduce the reactivity of the calcium hypochlorite while effectively functioning as a coagulant when the composition is dissolved in water.

As used herein, the term "substantially free" is used with reference to a pertaining to S2O8= means the accumulation of S2O8= in the water being treated, even when the composition results in the release of said compound, is less than about 2 ppm as S2O8=.

As used herein, the term "increased the rate of inactivation" means the time required to deactivate, or in effect kill the microbiological organisms for a given free available chlorine concentration is increased by uses the compositions disclosed in the invention. As a result of efficiently oxidizing the organics with free radicals and/or monopersulfate, the competing reaction between the free halogen donor, organic contaminants and microbiological organism is reduced. The resulting increased ORP along with its correlating increased rate of inactivation can be sustained without increased levels of free halogen.

As used herein, the term "increasing the rate of oxidation of oxidation resistant compounds" and all references in part means the oxidizing solution produced from the application of the composition reduces the time required to oxidize compounds that demonstrate the ability to resist oxidation from free halogen donors. Oxidation Resistant compounds includes those compounds comprising the outer membranes of microbiological organisms. Examples of oxidation resistant compounds include but are not limited to: cyanuric acid, hydantoin, organic N-chloramines, the chemical composition of the environmentally protective oocyst of cryptosporidium, the cellulose membrane of algae, and the like.

As used herein, the term "breakpoint" is used with reference to a process whereby a stoichiometric level of chlorine is added based on the concentration of ammonia in water to convert the ammonia into inert nitrogen gas. The accepted ratio based on weight percentages of chlorine to ammonia is 7.6:1 respectively. This process is also referred to as "breakpoint chlorination".

As used herein, the term "a given concentration (or residual) of free halogen donor" is used with reference to a condition where for a consistent concentration or range of measured free halogen donor in the aqueous solution, a relative rate of inactivation and rate of oxidation of organics is achieved. When the same range of free halogen donor and conditions are met, then the aqueous solution is treated with composition and methods of the invention, a measurable increase in the oxidation reduction potential, rate of: inactivation of microbiological organism and oxidation of organic contaminants is achieved.

As used herein, the term "microbiological organisms" is used with reference to all forms of microbiological life forms including: parasites, bacteria, viruses, and algae.

As used herein, the term "free halogen donor" is used with reference to a halogen source which acts as an active sanitizer when dissolved in water. Chlorine based free halogen donors form at least one of (Cl2, HOCl, OCl—) when added to water, whereby the species formed is pH dependent. Bromine based free halogen donors form at least one of (Br2, HOBr, OBr—), again the species being pH dependent.

As used herein, the term "potable water" is used with reference to water that can be consumed, such as in the case of drinking.

As used herein, the term "filtration" is used with reference to a process of physically removing or trapping water insoluble particles. Filtration typically requires passing water through a filter media such as sand or a membrane to trap the particles while allowing the water to pass thru the filter media.

As used herein, the term "fixed bed" is used with reference to a condition where the catalyst is in a fixed position, and the water being treated passes through or across the catalyst while the catalyst remains in a substantially unchanged position during the treatment process. The fixed position can be altered during periods when treatment is ceased, such as during a cleaning cycle. A fix bed can be exemplified by an aggregate of catalyst containing particles such as an alloy or catalyst impregnated substrate, whereby the water being treated passes through the aggregate while leaving the aggregate of catalyst substantially unaltered. Further still, the fixed bed can be exemplified by a cartridge or membrane whereby the catalyst is contained within. Yet another example includes a wire mesh. Further still the fixed bed can be an ionizer device that slowly releases the catalyst as a result of an electrochemical process.

As used herein, the term "peroxymonosulfate" encompasses the various species of the peracid chemistry and its various salts, whereby depending on the pH of the solution in which the peroxymonosulfate is added, the following species and combinations result: H2SO5= (Caro's acid), HSO5-, SO5=.

As used herein, the term "alkali metal salts of monopersulfate" includes but is not limited to potassium monopersulfate, and/or sodium monopersulfate. Potassium monopersulfate is commercially available under the trade names Caroat® (Degussa Initiators GmhB) and Oxone® (E.I. DuPont). Synonyms include peroxymonosulfate.

"Monopersulfate donor" can be any convenient source of monopersulfate. Monopersulfate dissolved in water forms HSO5-, and/or SO5= ions depending on solution pH.

As used herein, the term "aquatic facility" is used with reference to all structural components and equipment in contact with the water from an aqueous system. Examples of aquatic facilities include, but are not limited to, water parks, theme parks, swimming pools, spas, mammal habits at zoos, features such as fountains, waterfalls and the like.

As used herein, the term "skimmer" and "gutter" systems are used with reference to a portion of an aquatic facilities water circulating system. Skimmers and gutter systems collect and transport surface water from the main body of water comprising the swimming pool, spa, water-park ride etc. The water is pumped, filtered, and sometimes treated before being returned to the main pool or spa water. Treated added to the skimmer or gutters will contact the filter media as the water is circulated through the system.

As used herein, the term "aquatic Facility Circulating System" as defined inhere is part of the aqueous system of the aquatic facility comprised of at least: a contained body of water such as a pool, a means of collecting surface water (such as a gutter or skimmer system), a "main drain" which collects water from the bottom of the aqueous system, pipes to transport the said collected water(s) to a pumping system comprised of at least a pump, a filter system to remove water insoluble matter, and a piping return system that returns the circulated water back to the contained body of water (pool).

As used herein, the term "chlorite Donor" describes a compound that contributes chlorite ions to the water, whereby upon reaction with acid and/or free chlorine produces chlorine dioxide gas. Chlorine dioxide is known to those skilled in the art to be more effective at the inactivation of cryptosporidium and other parasitic organisms than free chlorine.

As used herein, the term "free flowing powder" means the composition(s) have a consistency of a pour able powder and/or granules.

As used herein, the term "bodily Discharge" is the release of at least one of: fecal matter, blood, stomach fluid into the aquatic facilities circulating system.

As used herein, the term "FIFRA registered sanitizer" the United States Environmental Protection Agency regulates the labeling and use of all pesticides, with includes antimicrobial agents under the Federal Insecticide, Fungicide, and Rodenticide Act (FIFRA).

As used herein, a "persulfate donor" is any compound or composition that includes at least 0.5 wt. % of a $S_2O_8^{2-}$ donor, such as sodium persulfate, potassium persulfate, and PMPS (potassium monopersulfate) produced from oleum.

As used herein, the term "sulfate free radical precursor" can be used with reference to either a donor of persulfate ($S_2O_8=$) and/or monopersulfate ($HSO_5-$). While alkali metal salts of monopersulfate exemplified by potassium monopersulfate typically comprise persulfate, it will be shown that certain catalyst (i.e. Co, V, Ru, Fe, Mn) can effectively produce sulfate free radicals and subsequent free radicals from monopersulfate. Monopersulfate being user friendly for many applications and non-irritating even by maintaining a residual while mammals are present, is a preferred choice of the invention for generating free radicals.

DETAILED DESCRIPTION OF THE EMBODIMENT(S)

Methods And Compositions of the Invention

The invention is based on the discovery that certain transition metal catalyst can be employed in multi-oxidizer based compositions and their respective solutions, to selectively decompose undesirable oxidants into desirable free radicals while leaving the desired oxidants substantially unaltered, resulting in enhanced sanitizing and oxidizing efficiency of the resulting solution.

Aqueous solutions contaminated with microbiological organisms, in particular oxidation resistant microbiological organisms and treated with compositions of the invention experience substantial improvements in the rate of inactivation of these organisms.

It has also been discovered that when certain catalysts are employed in the multiple oxidizer compositions of the invention, dramatic increases in the rate of decomposition of oxidation resistant organic contaminants, and an enhanced rate of inactivation of a wide range of microbiological organisms, including parasitic organisms that are resistant to traditional sanitizer treatments results.

At least one embodiment of the invention provides a means to effectively oxidize the oxidation resistant compound cyanuric acid, illustrating the superior oxidative strength of the resulting solution.

Aqueous solutions contaminated with microbiological organisms, in particular oxidation resistant microbiological organisms and treated with compositions of the invention experience substantial improvements in the rate of inactivation of these organisms. While not intending to limit the possible mechanisms that induce these improvements to one theory, it is theorized that sulfate free radicals generated by addition of compositions of the invention to an aqueous system can effectively inactivate microbiological organisms, e.g., by oxidizing and compromising the structural integrity of protective membranes, such as the protective oocyst of cryptosporidium. Once the protective oocyst is breeched, a weaker primary sanitizer such as chlorine, bromine and/or chlorine dioxide can effectively inactivate the microorganisms. The sulfate free radical treatment may therefore function as an "adjuvant" thereby improving the performance of the primary Federal Insecticide, Fungicide, and Rodenticide Act ("FIFRA") registered sanitizers on oxidation resistant, as well as common microbiological organisms such as E-coli, and the like.

Maintenance of sulfate free radical residuals to function as the primary sanitizer is not practical due to their high rate of decomposition, applying sulfate free radicals, or preferably forming them in-situ to an application treated with conventional sanitizers, e.g., chlorine or bromine provides a synergistic effect. The sulfate free radicals in effect release the free halogen donors so they can perform the process of sanitation more efficiently, as well as compromise the structural integrity of protective membranes of microbiological organisms, thereby allowing the sanitizers to work more efficiently.

Alternatively, one can apply a composition of the invention as a stand alone sanitizer for application to localized use. For example, in the case of a fecal release at an aquatic facility, a powder or solution form of the disclosed compositions can be applied to induce in-situ generation of sulfate free radicals. In this example, it is reasonable to have the composition FIFRA registered sanitizer for control of cryptosporidium and other microbiological organisms of concern due to the nature of the application, and the ability to place the sulfate free radicals formed in immediate and direct contact to the organisms. The sulfate free radicals can compromise the membrane of organisms including parasitic organisms, followed by cleavage of DNA. See, e.g., McLachlan, G. A.; et al., Metal-mediated oxidation of guanine in DNA and RNA: a comparison of cobalt(II), nickel(II) and copper(II) complexes. Inorg. Chim. Acta, 1996, 251, 193-199.

One embodiment of the invention provides compositions that comprises at least an alkali salt of monopersulfate that contains persulfate resulting in a solution rich in monopersulfate while the treated aqueous solution remains substantially free of persulfate Another embodiment of the invention provides composition that allow a persulfate donor to be applied to an aqueous solution to produce a solution containing sulfate free radicals, while the aqueous solution treated with the persulfate remains substantially free of persulfate.

Another embodiment of the invention provides for compositions that increase the rate of inactivation of microbiological organisms and the rate of oxidation of oxidation resistant compounds.

Variations of the disclosed compositions of the invention can be applied as shock treatments to recover a contaminated aqueous system, and/or fed while the contaminants are being added to the aqueous system.

Further, various embodiments of the compositions of the invention can be formulated to comprise FIFRA registered free halogen donors that can be used in place of traditional, less effective sanitizers like chlorine and bromine.

Methods of treating water to enhance the rate of inactivation of oxidation resistant microbiological organisms are also disclosed.

Sulfate Free Radicals

While sulfate free radicals can be produced from persulfate and other transition metals catalyst, the amount of catalyst for a given amount of persulfate is substantially higher in this system than in the monopersulfate system. Using the methods of the invention wherein the treated aqueous solution remains substantially free of residual persulfate, in the decomposition of persulfate and subsequent formation of sulfate free radicals, the transition metal catalyst is depleted and must be replaced for continued decomposition of persulfate to occur. If it is not replenished, residual persulfate will persist. While providing the benefit of enhanced oxidation of oxidation resistant compounds and eliminating the irritation of mammals during or after application to the aqueous system, the expense is much higher and the removal and replenishment of catalyst are troublesome. Also, it is desirable to remove the spent catalyst which is enhanced by precipitation with a coagulant to prevent staining and/or concentrations of spent catalyst that exceed allowable limits in drinking water and swimming pools.

Another benefit of the preferred invention is that low levels of catalyst can be applied to effectively produce free radicals from large quantities of monopersulfate, making the compositions of the invention extremely cost effective and suitable to a broader range of applications.

The invention provides a composition and a method for removing the COD and/or TOC from aquatic facilities and for enhancing the rate of inactivation of microbiological organisms while the facility is being used by swimmers, bathers, etc. With the invention, the organic compounds are oxidized as they are added to the water. Thus, the formation of trihalomethanes ("THMs") and chloramines is significantly reduced and the quality of air and water around the aquatic facilities is enhanced. This is particularly important wherein the aquatic facility is indoors or enclosed.

The invention allows for the application of potentially irritating oxidants (e.g., potassium persulfate) while the water is being used by swimmers/bathers. Irritation to the bathers is avoided by using a catalyst that rapidly reacts with the persulfate to form sulfate free radicals. This rapid catalyzed reaction eliminates the concern of persulfate accumulation (and corresponding irritation to the swimmers/bathers), and effectively decomposes the organic contaminants shortly after being added to the water, thereby preventing their accumulation.

The invention entails applying a catalyst to the water to maintain an "effective catalyst concentration," which is between about 1 ppb and about 1 ppm, more preferably between about 5 ppb and about 500 ppb. Then, a persulfate donor is added to the water, inducing the in-situ generation of sulfate free radicals through a catalyzed reaction. Sulfate free radicals have a reported potential of about 2.6 v.

When a low level of persulfate is applied to water in the presence of the catalyst, sulfate free radicals are formed that effectively decompose the organic compounds while preventing the accumulation of persulfate, $$S_2O_8^{2-} + Catalyst \square Catalyst + SO_4^{2-} + SO_4^*$$

$$SO_4^* + Organics >>> [\ldots \text{many steps} \ldots ] CO_2 + H_2O$$

Furthermore, when a cobalt catalyst is contacted with monopersulfate, the sulfate free radical formation proceeds as follows:

$$Co^{2+} + HSO_5^- \square Co^{3+} + SO_4^* + OH^-$$

and/or $$Co^{2+} + HSO_5^- \square Co^{3+} + SO_5^* + H^+$$

The resulting oxidizing solution from the cobalt-monopersulfate system provides many advantages to increasing the rate of inactivation to organic contaminated waters.

The sulfate radicals can extract an electron from any of the atoms comprising the organic compound, thereby forming a radical within the organic compound itself. This imparts an auto-catalytic decomposition of the organic compound, rather than formation of aldehydes, ketones, and subsequent carboxylic acids common to the weaker, oxygen substituting oxidizers. As the sulfate free radicals decompose the organic compounds, any sanitizer (e.g., free halogen donor) in the water is released to effectively control the bacteria, virus, parasites and algae. The reduced organic loading of the water enhances the ORP for a given concentration of free halogen donor. In turn, the higher ORP has been related to increased rates of inactivation. To further enhance this process, it is theorized that reactions between monopersulfate and cobalt form cobalt coupled with a superoxide, the complex represented by Co—O—O—Co. With a redox potential of 1.92, residual cobalt superoxide further enhances oxidation of organics and protective organic membranes and biofilms or micro-biological organisms.

Using cryptosporidium as an example, the efficiency of oxidation from sulfate free radicals as well as the formation of radicals from organic compounds rapidly compromises the structural integrity of oocyst that protect the cryptosporidium. Once the protective oocyst is compromised, sanitizers as well as direct reactions between the sulfate free radicals and cryptosporidium can effectively inactivate the organism. While exemplified with cryptosporidium, this invention has broad spectrum utility in the inactivation of microbiological organisms in aqueous systems.

The persulfate donor and the catalyst can also be combined with a free halogen donor. Free halogen donors act as effective sanitizer/oxidizer that rid the water of inorganic nitrogen such as mono- and di-chloroamines while keeping the treated water substantially free of persulfate.

To form the powder mixture, the catalyst is admixed with the sulfate free radical precursor in a container such as a ribbon mixer or other common commercially available blending/mixing device. In compositions comprising a free halogen donor or other constituents such as coagulant, the free halogen donor and other constituents are also admixed to form the final composition. Depending on the sulfate free radical precursor and free halogen donor, a barrier film may be incorporated into the mixture. The barrier film can be added during any point during the blending/mixing process, but preferably it is added to at least pre-coat at least one of either the sulfate free radical precursor and/or free halogen donor.

In some embodiments, the composition may be formed into an agglomerate, e.g., to form granules or tablets having any convenient geometric configuration. Embodiments of the invention that include free halogen donors, may add a barrier film to segregate constituents of the composition that are considered incompatible, or to improve overall stability of the composition during processing and storage under less than desirable environmental conditions (i.e. moisture, heat, etc.).

The techniques and equipment for blending/mixing and agglomerating is widely available from toll blenders and packagers, as well as commercially available manufacturers such as Fitzpatrick Company based in Elmhurst, Ill. Barrier films are incorporated into the composition when the stability or reactivity of the final composition is considered to be unacceptable. The type of barrier film is selected based on the behavior of the components, stability or reactivity of the composition.

For example, calcium hypochlorite is a Class III oxidizer under NFPA fire codes and can induce spontaneous combustion when exposed to fuel sources. As illustrated in the NFPA fire codes, reducing the concentration of calcium hypochlorite in a composition to <50 wt % reduces the classification to a class II oxidizer. Diluting the hydrated calcium hypochlorite with an inert salt that does not effect the hydration of the calcium hypochlorite will reduce its NFPA classification. Further still, adding hydrates such as magnesium sulfate heptahydrate to the composition to obtain a composition have a moisture content of at least 17 wt % results in a product that under Division 5.1 of the Department of Transportation is non-hazardous (U.S. Pat. No. 6,638,446).

Barrier films such as magnesium carbonate sold under the trade name Elastocarb™ by Akrochem have very low bulk density thereby increasing the segregation of constituents in the composition for a given weight percentage of Elastocarb™ more so than high density compounds like magnesium sulfate heptahydrate. By volume comparison, it take about 15 wt % of magnesium carbonate to provide the amount of segregation of calcium hypochlorite than the magnesium sulfate heptahydrate. Furthermore, upon exposure to temperatures of about 200 degrees celcius, the Elastocarb™ releases both water and carbon dioxide in an endothermic (energy consuming) reaction, thereby cooling the reaction while the released vapors displace the fuel from the surface of the calcium hypochlorite. Combining magnesium carbonate into the composition not only improves the stability of the composition, it can improve the processing, packaging, shipping, storage, and handling of the final product by making it less reactive.

Another example is aluminum trihydrate reduces the reactivity of calcium hypochlorite compositions by releasing water vapor at about 205 degrees celcius thereby cooling as well as moving fuel vapor away from the calcium hypochlorite. Another added benefit is its ability to absorb oil based fuels thereby further separating the calcium hypochlorite from fuel vapors. Further still, the performance of the resulting composition is enhanced by the aluminum trihyrdate forming a coagulating agent when dissolved and dissipated into the treated water, thereby enhancing water clarification and precipitation of organics in the treated water.

Yet another example of obtaining multiple benefits from addition of a barrier film is the addition of aluminate donors or aluminum trihydrate to compositions comprising free halogen donors containing cyanuric acid, such as trichloroisocyanuric acid. One advertised benefit of trichloroisocyanuric acid is its slow release of chlorine. One tablet in a swimming pool tablet feeder can last for hours or days. This is the result of the low solubility of trichloroisocyanuric acid. When this compound is formulated with readily soluble compounds such as potassium monopersulfate, the rate of dissolution of the resulting tablet is increased. By incorporating at least one of aluminate donor or aluminum trihydrate, as the components of the composition dissolve, the aluminum based component, being amphoteric, forms cationic charged polymers that ionically react with the anionic charged cyanuric acid, thereby forming a precipitate that slows the rate of dissolution. With continued exposure and eventual rise in pH the ionically bound precipitates release, allowing the coagulating effects of the continue in the aqueous system.

Barrier films can be selected from a wide range of compounds, either organic or inorganic. While not limiting the scope of the invention based on a specific type of barrier film, the following are examples of anticipated useful compounds for these compositions: magnesium carbonate, magnesium hydroxide, magnesium oxide, magnesium sulfate and the any combination of these magnesium compounds. Further still, various aluminum based compound such as aluminum sulfate, alkali metal salts of aluminates, aluminum trihydrate. Various silicate based compounds specifically hydrates that can form gels such as clays can be very useful as barriers films in oxidizer compositions that can also reduce dissolution rates of the composition.

Furthermore, barrier films need not be added during the processing of the composition. They can be added to one or more of the components of the composition as part of that components manufacturing process. Potassium monopersulfate for example is typically treated with magnesium carbonate to coat the granules and function as an anti-caking agent so that the resulting product is free flowing (reference U.S. Pat. No. 7,090,820B). While additional barrier film can be applied such as in cases of combined the potassium monopersulfate with calcium hypochlorite, in some instances such as in the case of hydrated form of dichloroisocyanuric acid, the additional barrier film maybe optional.

The agglomerates may contain an agent that restricts the dissolution rate of the agglomerate. Examples of such agents include a substantially water insoluble wax such as polyethylene wax, polyoxyethylene wax and their respective fatty acid ester wax. An agent can also be a mineral salt of a carboxylic acid having at least 16 carbons, such as calcium stearate and similar hydrocarbon based salts. Further still, the agent may be a gel-forming material such as a polaxamers, polyacrylic acid, polyacrylamide, polyvinyl alcohol, polysaccharides such as Xanthan, and various cellulose based derivatives. The gel-forming material forms a gelatinous structure upon being exposed to water, effectively controlling the rate at which the agglomerate dissolves in the water.

Some embodiments of the composition can be packaged as a ready to use kit for application to aquatic facilities after release of a bodily discharge (i.e. fecal, vomit, blood etc.). The kit can include pre-measured doses of the various compositions, pre-measured doses in one-time use polyvinyl alcohol sacks or bags, or comprise a supply of composition for multiple applications.

Depending on the application of the compositions, ligand forming complexing agents such as organic phosphonates (examples, HEDP) sold under the trade name Dequest® by Solutia, or aminopolycarboxylic based (EDTA, DTPA, NTA) sold under the trade names Versene® and Versenex® by Dow Chemical can be employed to enhance the stability of resulting solutions. These complexes can also be employed to delay or slow the rate of decomposition so as to extend the decomposition process over an extended period of time. Application of complexing agents can also improve the efficiency of the catalyst decomposition thereby reducing the ratio of catalyst to sulfate free radical precursor. The ligand complexing agents can be admixed with the compositions, added to the water into which the composition is to be added, or even complexed with the catalyst to form a catalyst-ligand complex. The formation of ligand complexed catalyst dramatically improves the stability of solutions comprised of high concentrations of the sulfate free radical precursor and catalyst.

The compositions of the invention can be applied using commercially available feed systems that dissolve either powders, granules or tablets of the compositions to form a solution, then dispensing the solution into the water to be treated. Examples of such feed systems include but are not limited to Polaris Watermatic G1000, Watermatic G7500, Pulsar II, III, and IV Calcium Hypochlorite feed systems, as well as various erosion feeders for feeding bromine and chlorine tablets. It should be pointed out that a simple tank with mixer and chemical pump will suffice as well.

Also, the composition of the invention can be applied directly to the water to be treated by decanting or broadcasting the composition into or across the surface of the water.

It is anticipated that various modifications to the disclosed methods for increasing the rate of oxidation and inactivation of resistant compounds and organisms can be achieved while remaining within the scope of the invention. For example, water treated with catalyst and sulfate free radical precursor can be irradiated with ultra violet radiation to further enhance sulfate free radical formation and inactivation of microbiological organisms. Ozone can also be added to the treated system to enhance oxidation and inactivation of microbiological organisms, potentially eliminating or at least supplementing free halogen sanitizers and/or chlorine dioxide.

EXAMPLES

Example 1

Persulfate Decomposition 1000 mL of a water-based stock solution containing 7.0 ppm persulfate was prepared by adding potassium persulfate (purchased from Sigma-Aldrich) to water and adjusting the pH to 7.2 using sodium bisulfate. The persulfate level was initially and periodically tested using ammonium thiocyanate and ferrous iron in an acidic solution. The stock solution was divided into 2-500 mL samples, and magnetic stirring rods were added to each sample. Using the magnetic stirrer, each sample was vigorously mixed to achieve a vortex reaching approximately half the distance to the stirring rod.

TABLE 1

Persulfate Decomposition Rate

| Lapsed Time (Hrs.) | Persulfate Conc. (ppm) with 0.63 ppm Ag catalyst | Persulfate Conc. (ppm) with 0.31 ppm Ag catalyst |
|---|---|---|
| 0 | 7.0 | 7.0 |
| 3 | 4.2 | 5.6 |
| 5 | 2.1 | 4.2 |
| 7 | <1.0 | 2.8 |

Table 1 shows that the persulfate concentration decreased with time. The test results in Table 1 illustrate that the catalyst comprising silver (Ag), and sourced from Silver nitrate (AgNO3) under conditions like those experienced in pools, can effectively decompose the persulfate irritant.

As the reactions proceeded, the pH of the solution increased. Therefore, during the test period, the pH was measured every 30 minutes and a solution of sodium bisulfate was administered as needed to maintain the pH at a range of about 7.2 to 7.5.

The test result indicates that when the reaction occurs in COD-laden water, the sulfate free radicals will enhance the effectiveness of the treatment (e.g., PMPS treatment) for decomposing the COD. The enhanced effectiveness in COD decomposition is related to the ability of sulfate free radicals to efficiently induce radicals on the organic complex and cleave bonds that otherwise would resist oxidation from the weaker monopersulfate. Moreover, with the persulfate irritant being removed rapidly with the catalyst, the invention allows PMPS (which is usually accompanied by some persulfate) to be applied while swimmers and bathers are present in the water.

The composition, which is substantially soluble in water, may be made into a solution before being added to the COD-laden water. In some cases, the solution is prepared in a container before being delivered to the pool by an eductor system, a chemical metering pump, or pressure differential between the inlet and outlet water supply of the container. In other cases, the solution is made by adding the composition (e.g., in agglomerated form) to the circulating water of the system.

If desired, additional persulfate donor can be fed separately to the water to further enhance the formation of sulfate free radicals.

Example 2A

Cyanuric Acid Destruction Field Test #1

A composition comprising 99.1 wt % potassium monopersulfate sold under the trade name Caroat® by Degussa Initiators GmbH and Co. was combined with 0.2 wt % cobalt acetate, 0.2 wt % Dequest 2016D, 0.5 wt % magnesium carbonate (lite), blended and packaged in 5.5 gallon plastic pails with a plastic bag liner.

A pool experiencing cloudy water, high chlorine use, high cyanuric acid levels and a low ORP operated with the following parameters:

Volume 250,000 gallons, cyanuric acid 90 ppm, ORP 670 mV, Free Chlorine 4-5 ppm using DPD methodology, where DPD (N,N-Diethyl-p-Phenylenediamine) is a U.S. EPA approved testing methodology for determining free chlorine in water.

With the pool closed, the system filters and skimmer lines were treated by adding approximately 10 lbs of a composition comprising 99.3 wt % Potassium monopersulfate, 0.5 wt % Magnesium Carbonate, and 0.2 wt % Cobalt Acetate into the skimmer lines and closing a valve to isolate them from the remaining circulating system. The remaining 40 pounds was added directly into the filter followed by 60 minutes of reaction time to allow the treatment to remove accumulated waste on the filter media and piping. After 60 minutes, the filter was backwashed and the skimmer line valve was opened to allow the treated skimmer lines to discharge their contents during the backwash cycle.

After completing a 10-minute backwash, the system pool was treated with 500 lbs of the disclosed treatment by broadcasting across the surface of the pool, followed by addition of 100 lbs of soda ash, also by broadcasting.

The ORP setpoint was set to 780 mV and the chlorine feeder was filled to ensure sufficient chlorine was available in the feeder.

After addition of the treatment, the ORP controller jumped to 1000 mV and began slowly dropping. Approximately 7 hours later, the water was again treated with some soda ash to elevate the pH (6.8 based on controller readings) to at least 7.2. Once the pH was balanced, the water was again tested, which resulted in the following: Cyanuric acid 25 ppm, ORP 783 mV with 2.5 ppm free chlorine, combined chlorine 0.0 ppm, and a pH 7.3.

The ORP setpoint was set to 760 mV and a second treatment sold under the trade name Chlorine Companion™ by Truox, Inc. based out of McClellan Calif., was fed on a 24/7 basis using a tank, mixer and stenner pump to feed a solution of the treatment. After two week of high use operation, the pool's ORP setpoint is sustained at 760 mV with 2.0 ppm free chlorine while the water remains sparkling clear.

The results of this field test illustrate the rapid nature of one of the treatments disclosed in the invention to recover a contaminated pool. Also, it is disclosed that at least one composition of the invention has the ability to effectively oxidize cyanuric acid which is know to those in the art to be highly resistant to oxidation from traditional sanitizers and oxidizers used in pool water treatment. The capability of the sulfate free radicals generated from the monopersulfate-cobalt system to rapidly oxidize highly resistant compounds is an extremely important, since the rate of sulfate radical formation can be controlled by altering concentrations of catalyst and monopersulfate. As such, a continuous process of sulfate free radical oxidation can be achieved in the aquatic facility thereby compromising the protective layers of various microbiological organisms, such as cryptosporidium, algae and the like.

Example 2b

Cyanuric Acid Destruction Field Test #2

An outdoor water-park had two water systems experiencing water quality issues. Water1 had a volume of 112,000 gallons and approximately 15 ppm cyanuric acid, while Water 2 had 354,000 gallons and approximately 20 ppm cyanuric acid. Water1 was treated with 200 lbs of potassium monopersulfate-cobalt acetate composition, while Water 2 was treated with 600 lbs of said treatment. Both Water systems were treated with 20 lbs soda per 100 lbs of treatment, and the ORP setpoint were set to 760 mV.

Both pools opened on time the next morning and had measured cyanuric acid levels of 0.0 ppm, again illustrating the ability of the sulfate free radicals produced from the Cobalt-MPS system to decompose cyanuric acid.

Example 3

Algae Destruction

In an outdoor 360,000 gallon pool contaminated with planktonic algae, 200 lbs of the cobalt monopersulfate composition comprising 99.3 wt % Potassium monopersulfate, 0.5 wt % Magnesium Carbonate, and 0.2 wt % Cobalt Acetate as previously disclosed was added to the system by broadcasting. 40 pounds of soda ash was added to neutralize excess acidity, and the ORP controller was set at 780 mV.

In 72 hours, the pool water sparkled with no visible signs of algae. The ORP was consistently achieving 780 mV with 2.0-2.5 ppm of free chlorine.

For comparison purposes, the same pool system during the opening procedure was treated with 500 lbs of calcium hypochlorite and allowed to circulate for 7 days before obtaining the water clarity and being allowed to open to swimmers.

The superior speed and effectiveness of one of the compositions disclosed in this invention under real-world conditions is again highlighted. Algae can be resistant to control by chlorine due to organic contamination which induces a competing reaction for the chlorine, the structural integrity of cellulose that inhibits rapid destruction of the algae can be rapidly overcome using the powerful compositions of the invention.

Example 4

K2S2O8 Destruction 99.8 grams of distilled water was weighed in a 250 ml beaker. 0.6 grams of K2S2O8 was added to the beaker of water, placed on a magnetic stirrer and mixed until dissolved. Sodium bisulfate was added to suppress the pH, with a resulting pH of approximately 3.2. A sample of solution was diluted by carefully weighing out 99 grams of distilled water into a flask, followed by addition of 1-gram of solution and mixed. The diluted sample was tested using a Chemets® Kit K-7870. The resulting solution was measured as having a sodium persulfate concentration of approximately 49 ppm.

To the remaining sample of persulfate solution in the 250 ml beaker, 0.1 grams of cuprous chloride was added and mixed until dissolved, resulting a clear blue tinted solution about 2 minutes. A 99:1 dilution was again performed and tested using the Chemets Kit K-7870, resulting in a measurement of 0.0 ppm.

Example 5

Catalyst Precipitation 20 grams of potassium monopersulfate, 0.1 grams cuprous chloride and 80 grams distilled water was added to a 250 ml beaker and mixed on a magnetic stirrer until dissolved. 1 gram of solution was carefully measured and diluted with 99 grams of distilled water. The diluted sample was treated with sodium bisulfite to remove residual monopersulfate, the pH was then adjusted to 7.3 using a diluted solution of sodium hydroxide. The resulting clear solution was tested using a HACH Company Method 8506 bicinchoninate-powder pillow test procedure and a DR-2000 spectrophotometer. The resulting copper level was measured and corrected compensate for the dilution. The final result being 4.9 ppm as Cu.

A second 1-gram sample from the original solution was neutralized with sodium bisulfite, then treated with 2-grams of 0.1 wt % alum solution to achieve approximately 20 ppm as alum in the diluted solution. The pH was adjust with dilute sodium hydroxide to achieve a pH of approximately 7.3, mixed for about 5 minutes, then allowed to settle in a graduated cylinder. 25 ml of clear water was decanted and tested for copper, resulting a value of 0.78 ppm as Cu.

Example 6

PMPS Survival

A composition comprising 0.65 wt % aluminum sulfate, 0.35 wt % cuprous chloride, 99 wt % Caroat® was blended and packaged in 6 gallon plastic pails including a plastic bag liner.

50 lbs of the composition was added to 30 gallons of water and mixed for 120 minutes. About 1-liter of sample was removed and tested for both persulfate and available oxygen using standard iodiometric methods.

A diluted sample was prepared by adding 1-gram of sample to 999 grams of distilled water resulting in a solution containing an estimated 150 ppm of potassium monopersulfate triple salt, and approximately 4.5 ppm of potassium persulfate.

10 grams of diluted sample was treated with potassium iodide and titrated with thiosulfate solution to determine the total amount of titrant required to neutralize the oxidant level (135 drops).

To the second 10 gram sample 135 drops of thiosulfate solution was added to first neutralize the potassium monopersulfate. Sodium thiosulfate does not react with persulfate and therefore will allow the oxidant to remain for analysis. The resulting solution was tested using the Chemets® Kit K-7870 resulting in 0.0 ppm as sodium persulfate.

After approximately 24 hours of resting in a covered beaker, the remaining stock solution remained stable. No gas bubbles were observed on either the wall of the beaker or being released from the solution.

Example 7

Glycine Destruction 1000 ml of distilled water was treated with glycine to provide approximately 25 ppm of glycine and mixed till dissolved. Approximately 0.25 grams of cobalt acetate was added and mixed till dissolved. 0.5 grams of potassium monopersulfate was added and mixed till dissolved. Periodically the pH was adjusted by addition of a diluted solution of potassium carbonate. Also qualitative measure of oxidant measure was performed using a small 10 ml sample of solution treated with potassium iodide. The resulting solution would develop varying shades of orange to yellow, with orange indicating higher concentrations, fainter yellow indicating lower concentrations of treatment.

The pH was tracked since CO2 formation from conversion of the carbon based glycine with the resulting oxidant forms carbon dioxide which subsequently forms carbonic acid. When the pH suppression is reduced, the reaction between system oxidants and carbon is completed. After 105 minutes of reaction, the suppression of pH stopped. The test was allowed to continue while observing for an additional 15 minutes, after which time, 1.5 grams of 1% calcium hypochlorite solution was added to the solution.

After 20 minutes of continued mixing the solution was tested for free chlorine and combined chlorine resulting in: 7.0 ppm Free Chlorine, 0.0 ppm Combined Chlorine.

The test clearly illustrate that catalyst selection can impose a dramatically different effect with respect to solution stability and which oxidants are involved with in-situ generation of free radicals.

In one embodiment, a copper or silver catalyst can be included with a persulfate donor such as potassium monopersulfate which typically comprises from 2-5 wt % K2S2O8 to produce a solution rich in monopersulfate but substantially free of S2O8=. Further still the data illustrates the same invention using a persulfate rich donor such as sodium persulfate will allow for treatment of an aqueous solution with sulfate free radicals while keeping the treated system substantially free of S2O8=.

In yet another embodiment of the invention, the composition can be formulated to allow effective catalytic decomposition of the persulfate, inactivation and subsequent precipitation of the spent catalyst, thereby preventing problems resulting from accumulation of the catalyst.

Another embodiment of the invention disclosed by the test results shows the dramatically increased rate of oxidation of organic compounds as well as the rapid decomposition of the oxidant itself. Further still, organic compounds that are highly resistant to the sulfate free radical precursor as well as other oxidants commonly used in the treatment of aquatic systems are readily oxidized by the resulting sulfate free radicals, exemplified by the potassium monopersulfate-cobalt acetate composition and its decomposition of cyanuric acid.

Of significant importance is the impact these compositions have on improving the inactivation rates of microbiological organisms as illustrated by the rapid increase in ORP resulting from the destruction of competing reactions that impede inactivation rates of free halogen donors, and in some embodiments the ability of solutions of the compositions to effectively decompose oxidation resistant compounds that would otherwise compromise sanitizer performance in system contaminated by free halogen resistant organisms (i.e. cryptosporidium).

Example 8

| Cobalt-Monopersulfate Solution Stabilization | | | | | | |
|---|---|---|---|---|---|---|
| Ligand | Catalyst | Catalyst as Elemental | MPS % solution pH ~2.0 | 0 hr Result 199:1 dilution | 24 hr Result 199:1 dilution | 72 hr Result 199:1 dilution |
| N/A | CoSO4 | 20 ppb | 16.7 | very strong | very weak | ND |
| EDTA | CoSO4 | 20 ppb | 16.7 | very strong | very strong | very strong |
| HEDP | CoSO4 | 20 ppb | 16.7 | very strong | very strong | very strong |
| PBTC | CoSO4 | 20 ppb | 16.7 | very strong | Not Tested | very strong |

Figure 5A:
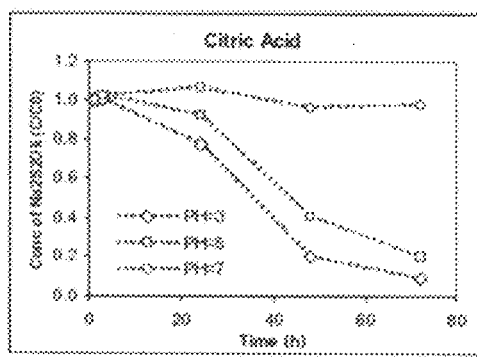
FIGS. 5A-D provide a graphic depiction of the stabilizing affect of various ligands in a sodium persulfate-iron system at various pHs. The data illustrates the selection of the proper ligand can effectively stabilize catalyzed persulfate solution at a specific pH, while allowing the catalyst to rapidly induce free radicals at another pH. Therefore, by including a properly selected ligand in the solutions of the compositions disclosed, the solution can be effectively stabilized for extended periods while maintaining a low pH with minimal loss of activity. However, when the solution is applied to a water system with elevated pH such as a pH of 7.0, the catalyst is activated and free radicals are formed.
Figure 5B:
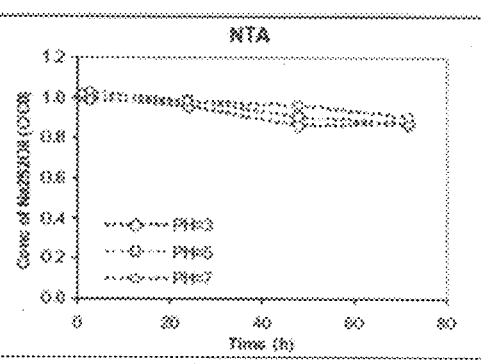
Figure 5C:
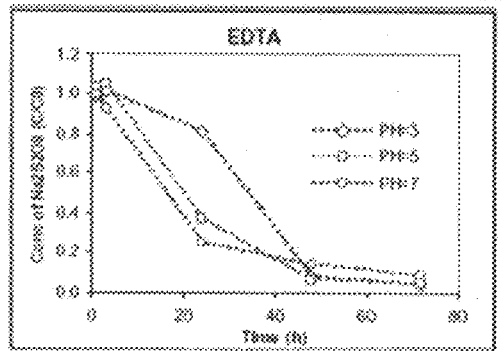
Figure 5D:
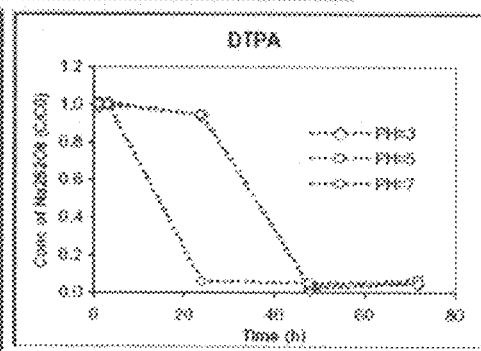

This table illustrates that concentrated solutions of MPS with cobalt catalyst present are decomposed at an unacceptable rate for solution storage. However, while the cobalt-MPS system is extremely effective at oxidizing organics including organic chelating agents, like FIG. 5, Table 1 illustrates that under the low pH conditions, various commercially available chelants effectively stabilize the low pH solution.

Although the foregoing invention has been described in some detail by way of illustration and example for purposes of clarity and understanding, it will be apparent to those skilled in the art that certain changes and modifications may be practiced. Various aspects of the invention have been achieved by a series of experiments, some of which are described by way of the following non-limiting examples. Therefore, the description and examples should not be construed as limiting the scope of the invention, which is delineated by the appended claims. The disclosures of all patents, publications (including published patent applications), database accession numbers, and depository accession numbers referenced in this specification are specifically incorporated herein by reference in their entirety to the same extent as if each such individual patent, publication, database accession number, and depository accession number were specifically and individually indicated to be incorporated by reference.

It is to be understood, however, that the scope of the present invention is not to be limited to the specific embodiments described above. The invention may be practiced other than as particularly described and still be within the scope of the accompanying embodiments.

It is claimed:

1. A method of removing organic contaminants in the water of an aquatic facility using in-situ generated sulfate free radicals, the method consisting of:

adding to water of an aquatic facility that is being used by swimmers/bathers, a transition metal catalyst selected from the group consisting of ruthenium, cerium, nickel, vanadium and combinations thereof, said transition metal catalyst is added to the aquatic facility in the form of ions derived from its elemental metal, in the form of an inorganic salt and/or in the form of a complex with an organic chelating agent, wherein said transition metal catalyst is added at a concentration to maintain a transition metal catalyst concentration of between about 5 ppb and about 1000 ppb measured as elemental metal in the water;

and subsequent to said addition of said transition metal catalyst to said water of said aquatic facility, adding a persulfate donor selected from the group consisting of: potassium monopersulfate, potassium persulfate, sodium persulfate and combinations thereof to the water of said aquatic facility, wherein said process sustains a persulfate concentration of less than 2 ppm in said aquatic facility.

2. A method of removing organic contaminants in the water of an aquatic facility using in-situ generated sulfate free radicals, the method consisting of:

adding to water of an aquatic facility that is being used by swimmers/bathers, a transition metal catalyst selected from the group consisting of ruthenium, cerium, nickel, vanadium and combinations thereof, said transition metal catalyst is added to the aquatic facility in the form of ions derived from its elemental metal, in the form of an inorganic salt and/or in the form of a complex with an organic chelating agent, wherein said transition metal catalyst is added at a concentration to maintain a transition metal catalyst concentration of between about 5 ppb and about 500 ppb measured as elemental metal in the water;

preparing an aqueous solution of persulfate donor selected from the group consisting of: potassium monopersulfate, potassium persulfate, sodium persulfate and combinations thereof; and feeding said aqueous solution of persulfate donor to said transition metal catalyst containing water of said aquatic facility;

wherein said process sustains a persulfate concentration of less than 2 ppm in said aquatic facility.

3. A method of removing organic contaminants in the water of an aquatic facility using in-situ generated sulfate free radicals, the method consisting of:

adding to water of an aquatic facility that is being used by swimmers/bathers, a transition metal catalyst selected from the group consisting of ruthenium, cerium, nickel, vanadium, and combinations thereof, said transition metal catalyst is added to the aquatic facility in the form of ions derived from elemental metal, in the form of an inorganic salt and/or in the form of a complex with an organic chelating agent, wherein said transition metal catalyst is added at a concentration to maintain a transition metal catalyst concentration of between about 5 ppb and about 500 ppb measured as elemental metal in the water;

preparing an aqueous solution of potassium monopersulfate and feeding said aqueous solution of potassium monopersulfate to said transition metal catalyst containing water of said aquatic facility;

wherein said process sustains a persulfate concentration of less than 2 ppm in said aquatic facility.

* * * * *